US009324127B2

(12) United States Patent
Mouri et al.

(10) Patent No.: US 9,324,127 B2
(45) Date of Patent: Apr. 26, 2016

(54) TECHNIQUES FOR CONSERVATIVE RASTERIZATION

(71) Applicant: QUALCOMM Incorporated, San Diego, CA (US)

(72) Inventors: Ouns Mouri, San Diego, CA (US); Vineet Goel, La Jolla, CA (US); Tao Wang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/454,394

(22) Filed: Aug. 7, 2014

(65) Prior Publication Data

US 2015/0235340 A1 Aug. 20, 2015

Related U.S. Application Data

(60) Provisional application No. 61/940,260, filed on Feb. 14, 2014.

(51) Int. Cl.
*G06T 1/20* (2006.01)
*G06T 17/10* (2006.01)
*G09G 5/18* (2006.01)

(52) U.S. Cl.
CPC . *G06T 1/20* (2013.01); *G06T 17/10* (2013.01); *G09G 5/18* (2013.01); *G09G 2310/08* (2013.01)

(58) Field of Classification Search
None
See application file for complete search history.

(56) References Cited

U.S. PATENT DOCUMENTS

| 6,222,550 | B1 | 4/2001 | Rosman et al. | |
|---|---|---|---|---|
| 7,119,809 | B1 * | 10/2006 | McCabe | G06T 11/40 345/422 |
| 7,221,368 | B1 * | 5/2007 | Crow | G06T 11/203 345/418 |
| 2003/0128204 | A1 | 7/2003 | Laws et al. | |
| 2005/0066205 | A1 | 3/2005 | Holmer | |
| 2005/0275663 | A1 | 12/2005 | Kokojima et al. | |
| 2007/0112902 | A1 * | 5/2007 | Dance | G06F 7/4873 708/500 |
| 2008/0198163 | A1 | 8/2008 | Nakahashi et al. | |
| 2012/0280992 | A1 | 11/2012 | Shebanow et al. | |

OTHER PUBLICATIONS

International Search Report and Written Opinion from International Application No. PCT/US2015/013550, dated Jul. 14, 2015, 9 pp.
Akenine-Moller et al., "Conservative and Tiled Rasterization Using a Modified Triangle Setup," Journal of Graphics Tools, 2005, vol. 10, No. 3, 7 pp. (Applicant points out that, in accordance with MPEP 609.04(a), the 2005 year of publication is sufficiently earlier than the effective U.S. filing date and any foreign priority date of Feb. 14, 2014 so that the particular month of publication is not in issue.).
Govindaraju, et al., "CULLIDE: Interactive Collision Detection between Complex Models in Large Environments using Graphics Hardware," Graphics Hardware, Jul. 2003, pp. 25-32.

(Continued)

*Primary Examiner* — Joni Richer
(74) *Attorney, Agent, or Firm* — Shumaker & Sieffert, P.A.

(57) ABSTRACT

This disclosure describes a method for performing conservative rasterization in a processor comprising determining vertices of a primitive, defining edges of the primitive by determining a set of edge equations based on the determined vertices, wherein the edge equations are based on an edge shifting parameter plus an offset, determining pixels that touch the edges of the primitive using the determined edge equations, and rasterizing the primitive using the determined pixels.

16 Claims, 8 Drawing Sheets

SHIFTING THE EDGE LINE OUTWARD IS EQUIVALENT TO SHIFTING THE SAMPLE POINT INWARD

(56) References Cited

OTHER PUBLICATIONS

Durand, et al., "Conservative Visibility Prepocessing using Extended Projections," Proceedings of ACM SIGGRAPH, Jul. 2000, pp. 239-248.

Koltun, et al., "Hardware-Accelerated From-Region Visibility Using a Dual Ray Space," 12th Eurographics Workshop on Rendering, Jun. 2001, pp. 204-214.

Crassin, et al., Octree-Based Sparse Voxelization Using the GPU Hardware Rasterizer, OpenGL Insights, Jul. 2012, pp. 303-319.

Hasselgren, et al., "Conservative Rasterization," GPU Gems 2, Jul. 2005, pp. 677-690.

McGuire, et al., "Hardware-determined feature edges," Proceedings of the 3rd international symposium on Non-photorealistic animation and rendering, NPAR, Mar. 2004 pp. 35-47.

\* cited by examiner

PIXELS WITH DOT SHADING WOULD BE EXCLUDED IN STANDARD RASTERIZATION SINCE THEIR CENTERS LIE OUTSIDE THE TRIANGLE

ASSUMING THE ORIGIN AT THE TOP LEFT CORNER OF THE WINDOW, THE VERTICES ARRANGED IN A CLOCKWISE ORDER, AND THE NORMAL n POINTING TOWARDS THE INSIDE OF THE TRIANGLE

SHIFTING THE EDGE LINE OUTWARD IS EQUIVALENT TO SHIFTING
THE SAMPLE POINT INWARD (a) Normal rasterization, (b) Correct conservative rasterization of initial triangle, (c) Correct conservative rasterization of triangle with slightly shifted vertex, (d) The actual output seen for the second triangle with conventional conservative rasterization techniques due to limited precision hardware

EFFECT OF OVER-CONSERVATIVE RASTERIZATION

TECHNIQUES FOR CONSERVATIVE RASTERIZATION

This application claims the benefit of U.S. Provisional Application No. 61/940,260, filed Feb. 14, 2014, the entire content of which is incorporated by reference herein.

TECHNICAL FIELD

This disclosure relates to techniques for graphics processing, and more specifically to techniques for conservative rasterization.

BACKGROUND

As graphics processing units (GPUs) become increasingly ubiquitous in the arena of hardware-accelerated applications (be it graphics applications or otherwise), they may be expected to provide a rich set of features to facilitate the efficient and correct implementation of a wide range of algorithms. One such feature is conservative rasterization.

In a standard rasterization pipeline, an inclusion test is carried out at a sample point usually being at the center of the pixel. If the sample is calculated to be inside the triangle, a fragment is generated for that pixel. The pixel is rejected otherwise. While this process succeeds in including all the pixels that are wholly contained within the triangle, several pixels along the edges may not be included even though they overlap the triangle. This is because the center of such pixels along the edges is outside the edge of the triangle.

Conservative rasterization is a rasterization technique that attempts to guarantee the inclusion of all the pixels that overlap, even partially, with each primitive. However, due to limited precision in hardware, conventional conservative rasterization may not always include all pixels that overlap a primitive.

SUMMARY

Conservative rasterization is a graphics processing technique with the goal of a identifying and rasterizing all pixels that touch a particular primitive. Conventional conservative rasterization techniques may not always identify all pixels that touch a primitive due to the limited precision of hardware. This is, since graphics processing hardware has a limited amount of precision in the fractional part of numbers used in calculations, the resultant rounding my result in some pixels being not correctly identified as touching a primitive during rasterization. In view of this drawback, this disclosure describes techniques for conservative rasterization that use an edge offset parameter to ensure that all touching pixels are identified during rasterization.

In one example of the disclosure, a method for performing conservative rasterization in a processor comprises determining vertices of a primitive, defining edges of the primitive by determining a set of edge equations based on the determined vertices, wherein the edge equations are based on an edge shifting parameter plus an offset, determining pixels that touch the edges of the primitive using the determined edge equations, and rasterizing the primitive using the determined pixels.

In another example of the disclosure, an apparatus configured to perform conservative rasterization comprises a memory configured to store primitive data, and a processor configured to determine vertices of a primitive, define edges of the primitive by determining a set of edge equations based on the determined vertices, wherein the edge equations are based on an edge shifting parameter plus an offset, determine pixels that touch the edges of the primitive using the determined edge equations, and rasterize the primitive using the determined pixels.

In another example of the disclosure, an apparatus configured to perform conservative rasterization in a processor comprises means for determining vertices of a primitive, means for defining edges of the primitive by determining a set of edge equations based on the determined vertices, wherein the edge equations are based on an edge shifting parameter plus an offset, means for determining pixels that touch the edges of the primitive using the determined edge equations, and means for rasterizing the primitive using the determined pixels.

In another example, this disclosure describes a computer-readable storage medium storing instructions that, when executed, cause one or more processors of a device configured to perform conservative rasterization to determine vertices of a primitive, define edges of the primitive by determining a set of edge equations based on the determined vertices, wherein the edge equations are based on an edge shifting parameter plus an offset, determine pixels that touch the edges of the primitive using the determined edge equations, and rasterize the primitive using the determined pixels.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
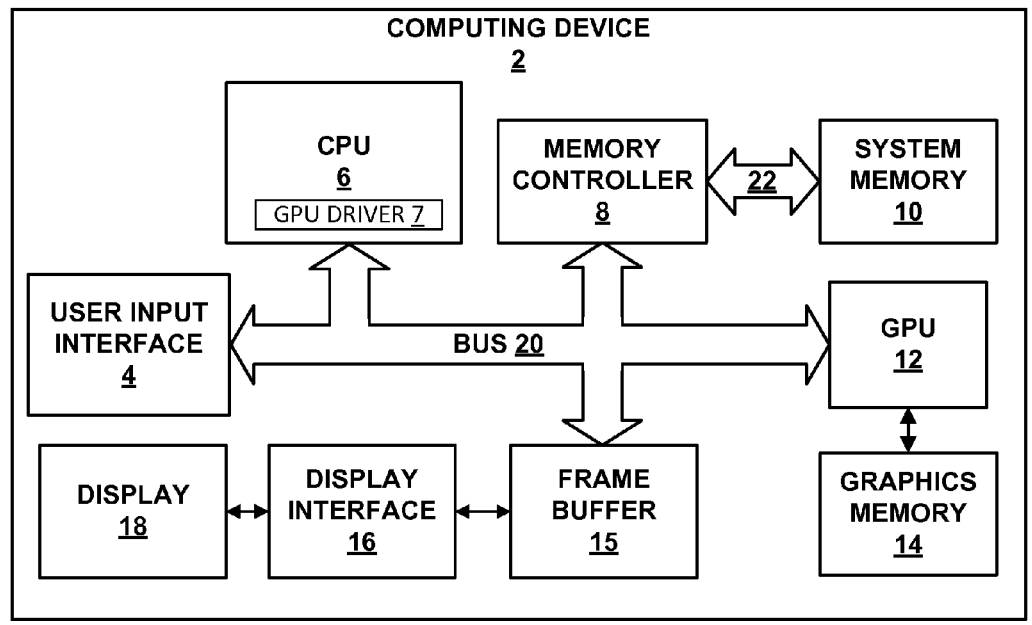
FIG. 1 is a block diagram showing an example computing device configured to use the techniques of this disclosure.

FIG. 1 is a block diagram illustrating an example computing device 2 that may be used to implement the techniques of this disclosure for conservative rasterization. Computing device 2 may comprise, for example, a personal computer, a desktop computer, a laptop computer, a tablet computer, a computer workstation, a video game platform or console, a mobile telephone such as, e.g., a cellular or satellite telephone, a landline telephone, an Internet telephone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a user input interface 4, a central processing unit (CPU) 6, a memory controller 8, a system memory 10, a graphics processing unit (GPU) 12, a graphics memory 14, a display interface 16, a display 18 and buses 20 and 22. Note that in some examples, graphics memory 14 may be "on-chip" with GPU 12. In some cases, all hardware elements shown in FIG. 1 may be on-chip, for example, in a system on a chip (SoC) design. User input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver 7 for controlling the operation of GPU 12. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 (e.g., through GPU driver 7) to cause GPU 12 to perform some or all of the rendering of the graphics data. In some examples, the graphics data to be rendered may include a list of graphics primitives, e.g., points, lines, triangles, quadrilaterals, triangle strips, etc.

In other examples, the software instructions that execute on CPU 6 may cause GPU 12 to execute a general purpose shader for performing more general computations applicable to be executed by the highly parallel nature of GPU hardware. Such general-purpose applications may be a so-called general-purpose graphics processing unit (GPGPU) and may conform to a general-purpose API, such as OpenCL Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate memory, but instead utilize system memory 10 via bus 20. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in a frame buffer 15. Frame buffer 15 may be an independent memory or may be allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. Alternatively, display 18 may be a stand-alone device coupled to computing device 2 via a wired or wireless communications link. For instance, display 18 may be a computer monitor or flat panel display connected to a personal computer via a cable or wireless link.

As will be described in more detail below, according to one example of the disclosure, GPU 12 may be configured to determine vertices of a primitive, define edges of the primitive by determining edge equations based on the determined vertices, wherein the edge equations are based on an edge shifting parameter plus an offset, determine pixels that touch the edges of the primitive using the determined edge equations, and rasterize the primitive using the determined pixels. In this way, an "over-conservative" rasterization of primitives may be achieved whereby no pixels touching the edges of the primitives are excluded, despite employing fixed-precision hardware. In some examples, a triangle setup engine of GPU 12 may be configured to perform the techniques of this disclosure.

Figure 2:
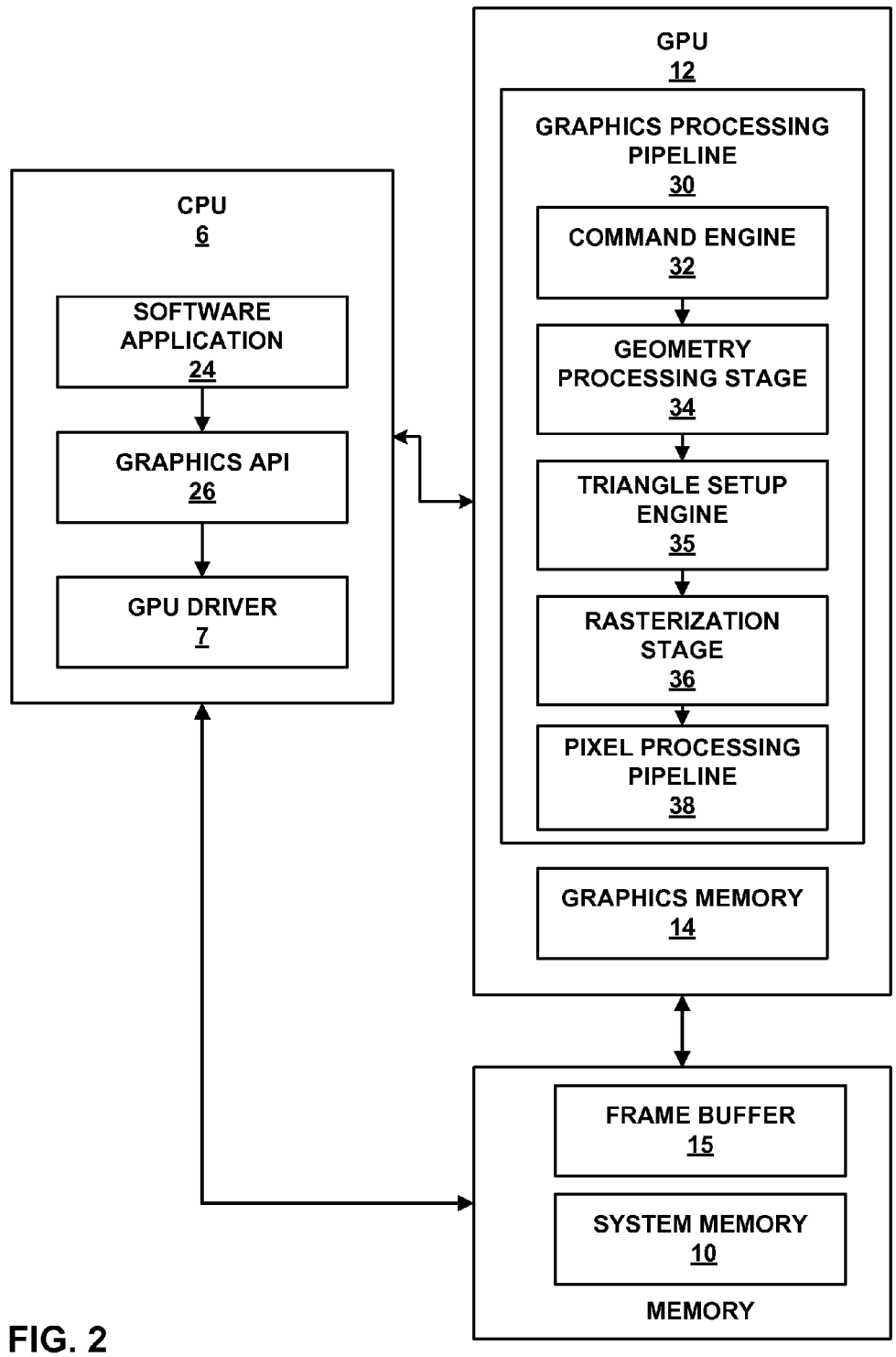
FIG. 2 is a block diagram showing example processing units configured to use the techniques of this disclosure.

FIG. 2 is a block diagram illustrating example implementations of CPU 6, GPU 12, and system memory 10 of FIG. 1 in further detail. CPU 6 may execute at least one software application 24, a graphics API 26, and a GPU driver 7, each of which may be one or more software applications or services that execute on CPU 6. GPU 12 may include a graphics processing pipeline 30 that includes a plurality of graphics processing stages that operate together to execute graphics processing commands. GPU 12 may be configured to execute graphics processing pipeline 30 in a variety of rendering modes, including a binning rendering mode and a direct rendering mode. As shown in FIG. 2, graphics processing pipeline 30 may include a command engine 32, a geometry processing stage 34, a triangle setup engine 35, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components. Memory available to CPU 6 and GPU 12 may include system memory 10 and frame buffer 15. Frame buffer 15 may be a part of system memory 10 or may be separate from system memory 10. Frame buffer 15 may store rendered image data.

Software application 24 may be any application that utilizes the functionality of GPU 12. For example, software application 24 may be a GUI application, an operating system, a portable mapping application, a computer-aided design program for engineering or artistic applications, a video game application, or another type of software application that may utilize a GPU.

Software application 24 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 24 may invoke GPU driver 7, via graphics API 26, to issue one or more commands to GPU 12 for rendering one or more graphics primitives into displayable graphics images. For example, software application 24 may invoke GPU driver 7, via graphics API 26, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 24 to GPU driver 7, GPU driver 7 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to frame buffer 40 associated with a display device. Graphics pipeline 30 may be configured to execute in one of a plurality of different rendering modes, including a binning rendering mode and a direct rendering mode.

GPU driver 7 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via graphics driver 7, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Again, graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Triangle setup engine (TSE) 35 is responsible for, among other things producing edge equations which may be used by rasterization stage 36 to generate fragments. In order for TSE 35 to calculate the edge coefficients used in the edge equations, TSE 35 is provided with the vertex coordinates in screen-space from geometry processing stage 34. These coordinates are expressed in a fixed precision format, which means that there is a possibility that their values were truncated when converted from their original floating point format. This may result in some pixels being rejected due to the precision loss. While this behavior is acceptable when graphics processing pipeline 30 is configured to perform standard rasterization, such pixel rejection compromises the results when graphics processing pipeline 30 is configured to perform conservative rasterization. Conservative rasterization is a rasterization technique that is, in theory, supposed to guarantee the inclusion of all the pixels that overlap—even partially—with each primitive. As will be discussed in more detail below, the techniques of this disclosure include techniques for computing edge equations and edge coefficients such that all pixels that overlap with a primitive are included, thus negating or reducing any loss due to fixed precision processing.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques known to those of skill in the art, such as, e.g., an edge-walking technique, evaluating edge equations, etc. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store Red, Green, Blue, Alpha (RGBA) components for each pixel where the "RGB" components correspond to color values and the "A" component corresponds to a destination alpha value, where the alpha value represents transparency. Although frame buffer 15 and system memory 10 are illustrated as being separate memory units, in other examples, frame buffer 15 may be part of system memory 10.

As GPUs become increasingly ubiquitous in the arena of hardware-accelerated applications (be it graphics applications or otherwise), GPU 12 may be expected to provide a rich set of features to facilitate the efficient and correct implementation of a wide range of algorithms. One such feature is conservative rasterization. As discussed above, graphics processing pipeline 30 may be configured to perform conservative rasterization.

In a standard rasterization pipeline, an inclusion test is carried out at a sample point usually being at the center of the pixel. If the sample is calculated to be inside the triangle, a fragment is generated for that pixel. The pixel is rejected otherwise. While this process succeeds in including all the pixels that are wholly contained within the triangle, several pixels along the edges may not be included even though they overlap the triangle. This is because the center of such pixels along the edges is outside the edge of the triangle. A combination of multisampling and target independent rendering may be used to reduce this effect, but it only offers a tradeoff for accuracy at the cost of performance without completely eliminating the problem. To eliminate the problem, infinite multisampling is required, which is impractical.

Figure 3:
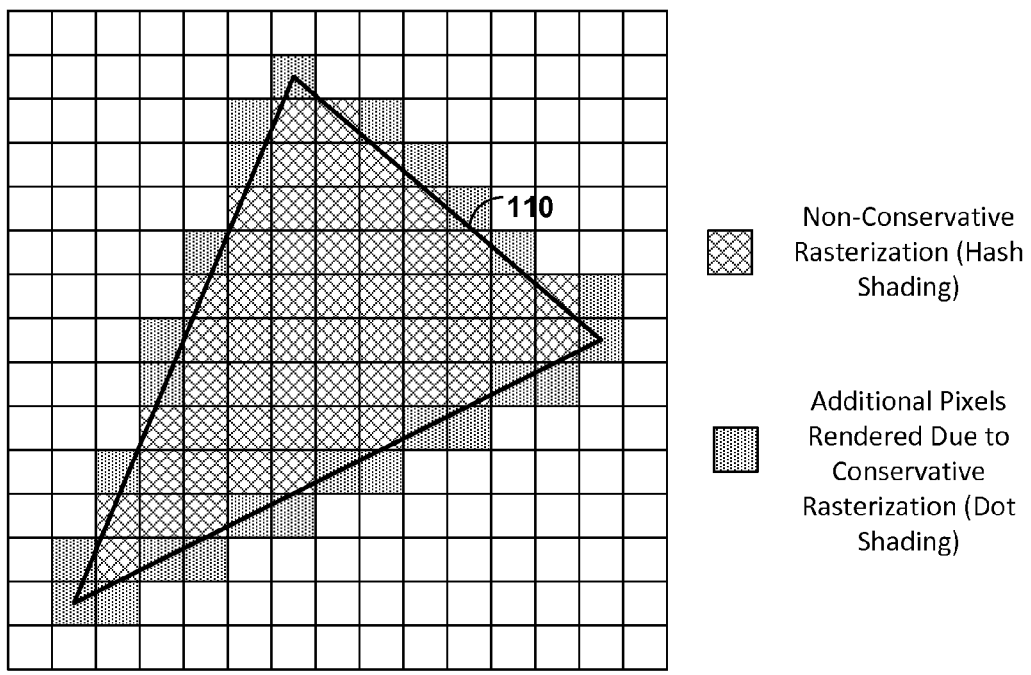
FIG. 3 is a conceptual diagram illustrating differences between standard rasterization and conservative rasterization.

Conservative rasterization is a rasterization technique that attempts to guarantee the inclusion of all the pixels that overlap—even partially—with each primitive (e.g., a triangle). FIG. 3 illustrates the difference between standard and conservative rasterization techniques. As shown in FIG. 3, traditional rasterization techniques (i.e., non-conservative rasterization) would only identify the pixels having their center on or within triangle 110. Such pixels are identified with hash shading in FIG. 3. Traditional rasterization techniques would leave out pixels that only partially overlap triangle 110 (i.e., pixels whose center is outside the triangle). Those pixels that only partially overlap triangle 110 (i.e., pixels whose center is outside the triangle) are shown with dot shading in FIG. 3. Conservative rasterization techniques are designed to also include those pixels with dot shading that only partially overlap the primitive, in addition to the pixels that having their center on or within triangle 110 (identified with hash shading).

There are several algorithms that may benefit from conservative rasterization in order to function optimally. Such algorithms may be used in applications such as collision detection, visibility testing, occlusion culling, and voxelization. Currently, developers who require the use of conservative rasterization resort to a shader-based implementation. The conservative rasterization techniques of this disclosure, however, are not limited to shader-based implementations, but may utilize a hardware implementation of conservative rasterization at the level of a TSE (e.g., TSE 35). It should be understood, however, that the techniques of this disclosure may also be implemented in a shader.

The next section of the disclosure will discuss triangle setup for conservative rasterization. Edge equations defining a primitive are used to determine if a particular pixel intersects the triangle. The three edges of a triangle are each represented by a function $E_i(x,y)$ based on the vertices of the triangle. The function $E_i(x,y)$ divides the screen space into a positive (to the right of the edge) and a negative (to the left of the edge) side. The function evaluates to 0 for any point lying on the edge. Given a point $s(x,y)$, this point is considered inside the triangle if $E_0(s)$, $E_1(s)$ and $E_2(s)$ are all $\geq 0$.

The edge functions are defined as follows:

$$E_0(s)=A_0x+B_0y+C_0$$

$$E_1(s)=A_1x+B_1y+C_1$$

$$E_2(s)=A_2x+B_2y+C_2$$

where $A_i$, $B_i$ and $C_i$ are coefficients associated with the locations of the triangle's three vertices, and are computed by TSE 35.

In the following, we consider that the triangle vertices are ordered clockwise and that the origins of the window and the bounding box are at the top left corner. Also, all the coordinates are in screen space and we ignore the z-component as it is only used to interpolate a depth buffer value (note that conservative depth may be used for certain applications like voxelization).

Figure 4:
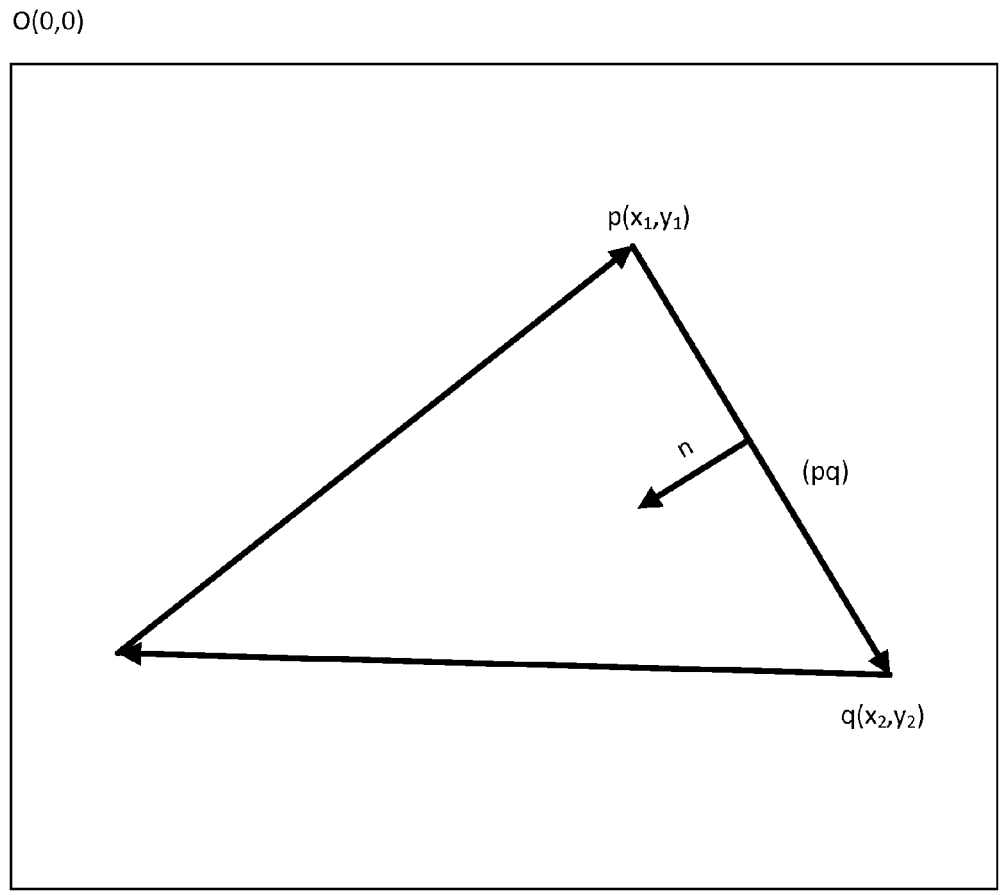
FIG. 4 is a conceptual diagram illustrating a primitive.

Consider the edge [pq] in FIG. 4 defined by the vertices $p(x_1, y_1)$ and $q(x_2, y_2)$. The edge equation is defined by the line (pq) which is expressed by the line equation:

$$Ax+By+C=0$$

where $s(x,y)$ is an arbitrary point, and $$-\frac{A}{B}$$

is the slope of the line. This yields:

$$A = y_2 - y_1$$

$$B = x_1 - x_2$$

and $$\begin{aligned} C &= -Ax_1 - By_1 \\ &= -(y_2 - y_1)x_1 - (x_1 - x_2)y_1 \\ &= x_2y_1 - x_1y_2 \end{aligned}$$

Therefore, the edge equation for an arbitrary point s(x,y) is defined as:

$$E(s)=(y_2-y_1)x+(x_1-x_2)y+x_2y_1-x_1y_2$$

The goal of conservative rasterization is to generate a fragment for each pixel that shares any amount of its area with the triangle being rendered. In the following example, we use a triangle as the use case without loss of generality. The techniques of this disclosure may be used with any primitive type.

Figure 5:
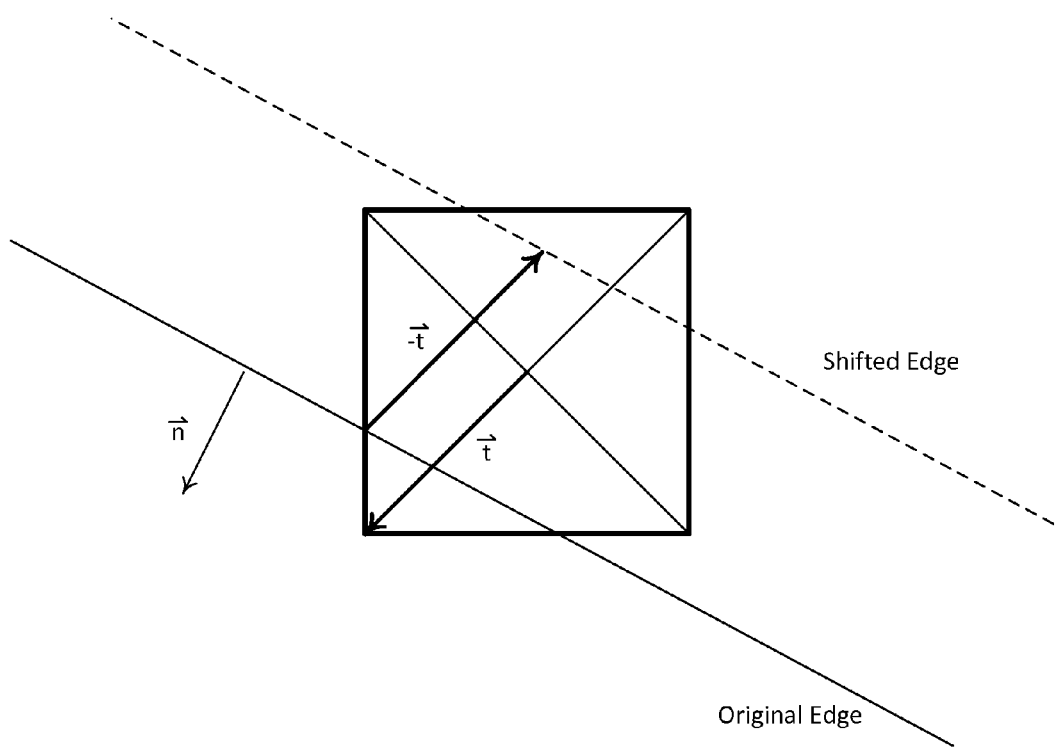
FIG. 5 is a conceptual diagram illustrating edge shifting in conservative rasterization.

One premise is that GPU 12 may be configured to confirm whether or not a pixel overlaps the area of a triangle (or other primitive) by only testing one of the four corners of the pixel for inclusion. GPU 12 may determine the inclusion of a particular pixel by evaluating the sign of $E_0(s)$, $E_1(s)$ and $E_2(s)$ at the corner location. But first, an appropriate corner is selected. One techniques of selecting a corner of a pixel involves selecting a semi-diagonal that lies within the same quadrant as the edge normal. In essence, this is equivalent to shifting the edge (defined by the edge equation) by one semi-diagonal in the opposite direction of the sample shift, as is shown in FIG. 5.

The E(s) edge equation presented in the previous section can be rewritten in terms of the "positive" normal $\vec{n}$ (pointing toward the inside of the triangle) of the edge [pq] once we observe that coefficients A and B are nothing more than the negative x and y coordinates of the non-normalized normal $\vec{n}$:

$$\vec{n}=(-A,-B)=(y_1-y_2,x_2-x_1)$$

Therefore:

$$E(s)=-\vec{n}\cdot\vec{s}+C$$

where:

$$C=\vec{n}\cdot\vec{p}$$

The vector $\vec{p}$ is a vector from origin o(0,0) to the vertex p (x1,y1).

Now that the equation is re-written in vector terms, it becomes easy to assess the value of $E(s+\vec{t})$ where $\vec{t}(t_x,t_y)$ is the semi-diagonal vector that shares the same quadrant as the normal vector.

We define the vector $\vec{t}$ (which may be referred to as an edge shifting parameter) from the center of the pixel to the selected corner (0.5 represents half a pixel width):

$$t_x=\begin{cases}0.5,&n_x\geq 0\\-0.5,&n_x<0\end{cases},\quad t_y=\begin{cases}0.5,&n_y\geq 0\\-0.5,&n_y<0\end{cases}$$

Now, instead of calculating the edge equation E(s), we instead calculate $E(s+\vec{t})$:

$$E(s+\vec{t})=-\vec{n}\cdot(\vec{s}+\vec{t})+\vec{n}\cdot\vec{p}$$
$$=-\vec{n}\cdot\vec{s}-\vec{n}\cdot\vec{t}+\vec{n}\cdot\vec{p}$$
$$=E(s)-\vec{n}\cdot\vec{t}$$

Therefore, to achieve conservative rasterization, the C term above may be modified to exclude the constant $\vec{n}\cdot\vec{t}$.

Thus:

$$C'_{Clockwise}=\vec{n}\cdot\vec{p}-\vec{n}\cdot\vec{t}$$
$$=C-\vec{n}\cdot\vec{t}$$

This technique effectively shifts the edge of the triangle outward to include the center of any pixel that it originally overlapped. Note that this is true for clockwise triangles. For counterclockwise, the term $\vec{n}\cdot\vec{t}$ is added to C to produce the same effect:

$$C'_{-Clockwise}=C+\vec{n}\cdot\vec{t}$$

Also, note that adding the term $\vec{n}\cdot\vec{t}$ instead of subtracting it from C in the case of C'$_{-clockwise}$ (and subtracting instead of adding in the case of C'$_{-clockwise}$) achieves what is referred to as "underestimated conservative rasterization" whereby only the pixels that are wholly contained within the convex hull of the triangle are rasterized. Additional description of conservative rasterization may be found in "*Conservative and Tiled Rasterization Using a Modified Triangle Setup*" by Tomas Akenine-Moller and Timo Aila, Journal of Graphics, GPU, and Game Tools, Volume 10, Issue 3, pp. 1-8, 2005.

An example implementation will now be discussed. In this example, the coefficients A, B and C are calculated within TSE 35 before rasterization. If conservative rasterization is enabled, TSE 35 will produce the modified C' term described above instead of C.

Before describing the actual implementation of conservative rasterization, an understanding of certain precision issues will be discussed. In order for TSE 35 to calculate the edge coefficients, it is provided with the vertex coordinates in screen-space. These coordinates are expressed in a fixed precision format (which means that there is a possibility their values were truncated when converted from their original floating point format). Below is an example to illustrate a potential problem.

Figure 6:
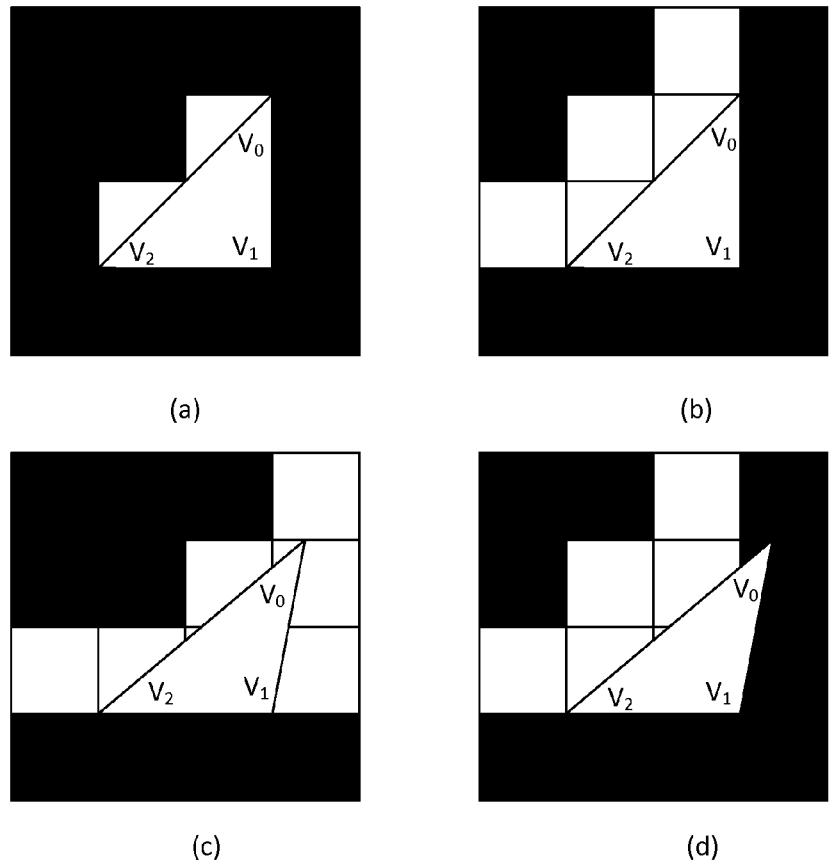
FIG. 6 is a conceptual diagram illustrating rasterization results using different techniques.

Referring to FIG. 6, assume that GPU 12 is rendering to a 4×4-pixel render target, that the GPU 12 hardware is limited to 8 bits of precision in the fraction part, and that the normalized coordinates of a triangle are expressed in the application as $V_0$ (0.5f, 0.5f, 0.2f), $V_1$ (0.5f, −0.5f, 0.2f), and $V_2$ (−0.5 f, −0.5f, 0.2f). As shown in FIG. 6, white pixels (shown as unfilled boxes) are included as touching the triangle with vertices $V_0$, $V_1$, and $V_2$. Black pixels (shown as filled boxes) would not be included. Normally, using traditional rasterization, GPU 12 would select the white pixels shown in FIG. 6(*a*) for inclusion when rasterizing the triangle. With conservative rasterization enabled, additional pixels with slight overlap would result, as shown in FIG. 6(*b*). As illustrated in FIG. 6(*a*) and FIG. 6(*b*), the (x,y) coordinates of $V_0$ translate to (3.0, 1.0) in screen space.

As shown in FIG. 6(*c*) and FIG. 6(*d*), if we change the x-coordinate of the $V_0$ vertex slightly to $V_0$ (0.5001f, 0.5f, 0.2f), the screen space coordinate for x should become 3.0002. Note that the vertex $V_0$ in FIG. (c) and FIG. 6(*d*) is exaggerated for illustration. However, since the precision of the hardware is often limited in the fractional part (e.g., to 8 bits, thus truncating any value below $$\delta=\frac{1}{256}),$$

the screen space coordinate appears in the hardware as 3.0. That is, the fractional part becomes truncated because of the limited precision. So, instead of getting the result as one would expect in FIG. 6 (*c*), the truncation would cause the result in FIG. 6(*d*), which is similar to the result of FIG. 6(*b*). From the standpoint of conservative rasterization and a developer's intention, such a result is obviously incorrect, or at least unexpected.

Note that this problem is reduced as the resolution increases. This is because the range of valid values in normalized device coordinates ([−1, 1]) maps to a larger number of pixels in screen space, and so small changes in the former result in big changes in the latter. In other words, for the problem to manifest itself at high resolutions, the change in normalized device coordinates (NDC) has to be extremely small.

In view of the foregoing, an exactly-correct implementation of conservative rasterization may not be possible due to the precision limitation inherent to the graphics hardware. Three options exist: (1) To accept the snapping and truncation of small values, (2) To provide an "over-conservative" rasterization which guarantees that no overlapping pixels are missed but may generate extra fragments, or (3) To optimally have the programmer choose which of the two previous options to activate.

Achieving the third option requires little to no additional resources other than exposing the possibility to the programmer. The remainder of this disclosure describes the techniques of an example implementation of the second option. That is, this disclosure proposes techniques for "over-conservative" rasterization, which guarantees that all pixels that touch a triangle will be included in the rasterization, while also possibly including some pixels that do not touch the triangle.

According to the techniques of this disclosure, to achieve an "over-conservative" rasterization that guarantees no overlapping pixels are missed, TSE 35 may be configured to calculate modified edge shifting parameters $t_x$ and $t_y$ by including an offset δ. One example is shown as follows:

$$t_x = \begin{cases} 0.5 + \delta & n_x \geq 0, \\ -0.5 - \delta & n_x < 0, \end{cases} \quad t_y = \begin{cases} 0.5 + \delta, & n_y \geq 0 \\ -0.5 - \delta, & n_y < 0 \end{cases}$$

Where:

$$\delta = \frac{1}{1 \ll \text{num\_fraction\_bits}}$$

δ is the offset and num_fraction_bits is the number of bits that a particular piece of hardware (e.g., GPU 12) is configured to use to represent the fractional part of a number. As such, the techniques of this disclosure may use a different offset depending the number of fractional bits supported by particular hardware.

Figure 7:
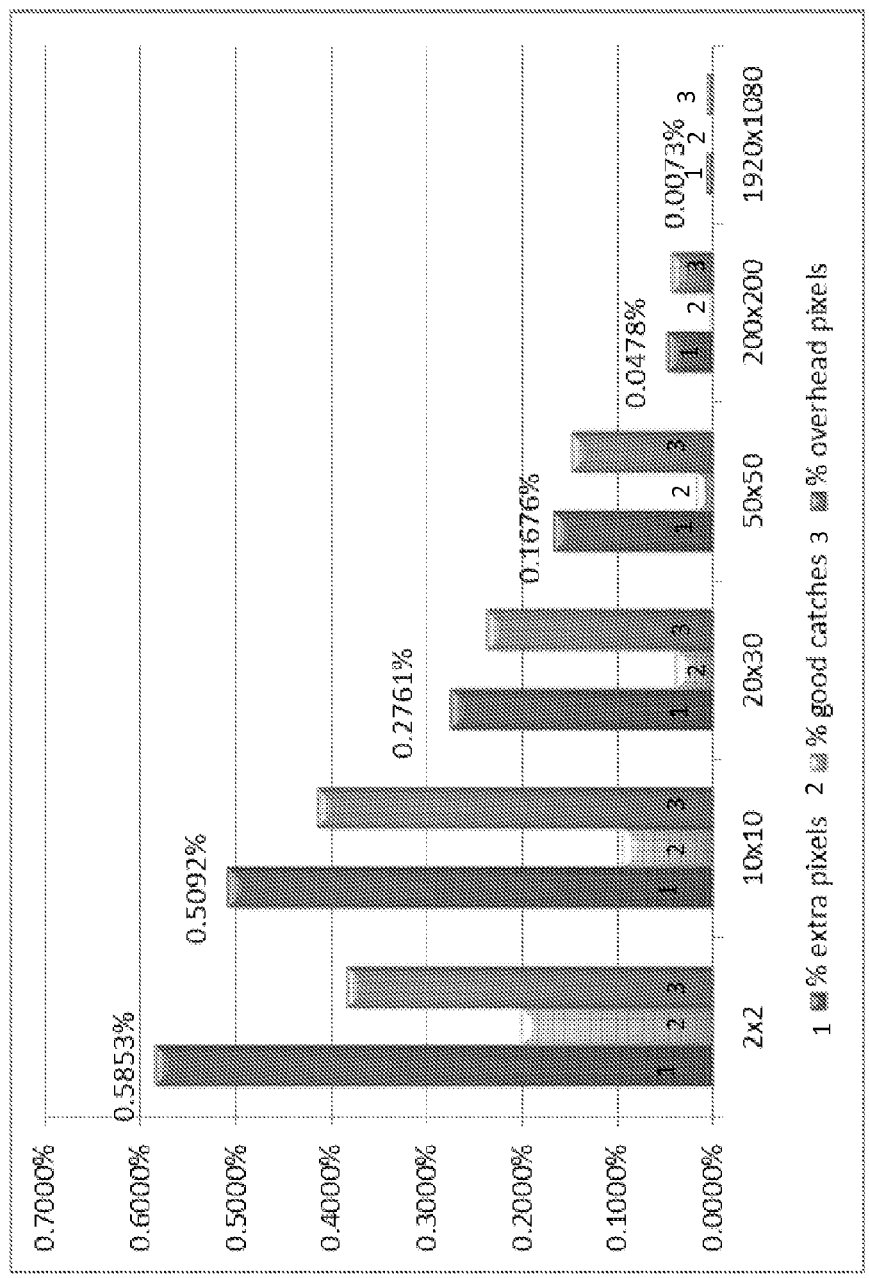
FIG. 7 is a bar graph showing test results of performing conservative rasterization according to the techniques of this disclosure.

An analysis has been conducted to study the effect of said over-conservative rasterization. FIG. 7 shows the results of this analysis. Several thousand triangles were randomly generated at different resolutions (x-axis) using a conventional conservative technique, as well as the over-conservative rasterization technique of this disclosure. The y-axis refers to the average percentage of the total number of pixels generated for the triangle (the area of the triangle). "Overhead pixels" are those that lie completely outside the triangle but for which a fragment has been generated. "Extra pixels" are those that were not included by conventional conservative rasterization techniques, but were included by the over-conservative rasterization techniques of this disclosure. "Good catches" refer to the pixels that would have been missed were it not for over-conservatism. In effect, the techniques of this disclosure result in the inclusion of more "good catches," at the expense of additional "extra pixels" being included. In some applications, it is more beneficial to have all pixels that overlap a primitive to be included than it is detrimental to have the "extra pixels" included.

As we can be seen in FIG. 7, the smaller the triangle, the more it is prone to having overhead pixels (i.e., extra pixels). However, in all cases, the number of such pixels does not exceed 0.4% of the total number of pixels generated for the triangle. This is an acceptable cost in order to guarantee correctness, which is in this case defined as no overlapping pixels being missed. Alternatively, one can ignore over-conservative rasterization techniques, and accept that at most 0.2% of pixels may be missed.

The hardware requirements for the example implementation of conservative rasterization of this disclosure are minimal. TSE 35 may be configured to execute four additions to adjust the bounding box (performed once per primitive), two sign comparisons, two additions (three in the case of a line), and two multiplications to calculate the dot product and adjust the C term (performed once per edge or line). This implementation is thought to be the worst-case cost because it does not take into account any optimizations.

For example, the sign comparisons may be eliminated by calculating the absolute value of A and B, and using them as the x and y coordinates of $\vec{n}$ respectively. TSE 35 may then use the positive value for $t_x$ and $t_y$:

$$\vec{n} = (|A|, |B|) \; t_x = t_y = 0.5 + \delta$$

This disclosure provides an elegant and efficient implementation of precision-corrected conservative rasterization that is possible in hardware. The cost, both in terms of hardware resources and clock cycles, is expected to be extremely small. It should be noted that the conservative rasterization techniques of this disclosure may also be used at the level of tiles/bins. In the tile example, the value of $\vec{t}$ (i.e., $t_x$ and $t_y$) would, in one example, be respectively equal to half the width and height of the tile.

Another example optimization is to include the ability to activate conservative rasterization on a per-edge basis. The benefit of this is that all the inner triangles of a mesh would have the over-conservative rasterization feature disabled, while only the contour edges of the mesh have over-conservative rasterization enabled. This carries with it the complexity of determining which are the silhouette edges, but that is a task that can be implemented in a shader.

In summary, the techniques of this disclosure allow for GPU 12 to preform conservative rasterization by using a modified edge shifting parameter (e.g., the term t=+/−0.5) as part of the calculation of the new edge coefficients. The techniques of this disclosure solve the aforementioned problem of fixed-precision hardware by adding a programmable offset "delta" to the edge shifting parameter t. In one example, delta=1/(1<<num_fraction_bits). This is the minimum value required to guarantee the correctness of the results (i.e., to guarantee that all pixels that touch the primitive will be included). Other example software-settable values of delta are delta=0, which means no accommodation for snapping will occur, or delta=0.5, which will effectively add a one-pixel contour to the triangle. All values between delta=0 and delta=0.5 will result in some level of overhead which has been found to be negligible (~0.2% of the triangle area). Overhead here is defined as fragments generated for pixels that, in reality, do not overlap the triangle. The advantage of this solution is that it provides versatility to the application to prioritize either correctness or "no overhead."

Figure 8:
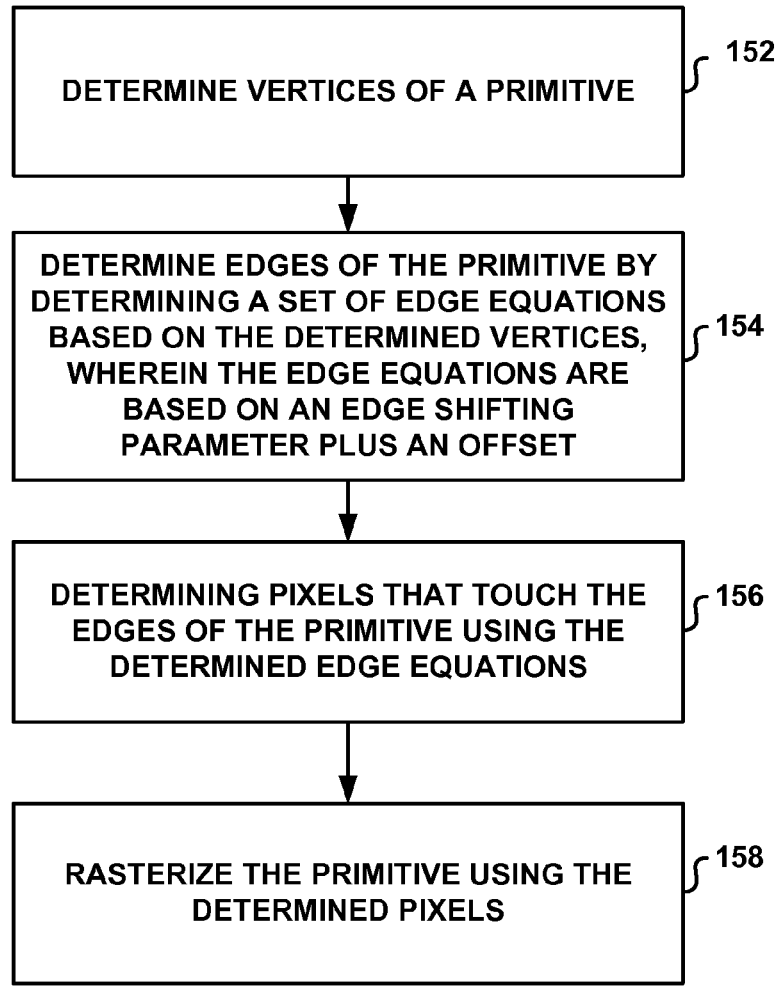
FIG. 8 is a flowchart showing an example method of the disclosure.

FIG. 8 is a flowchart illustrating an example method of the disclosure. The method of FIG. 8 may be performed by one or one hardware or programmable units of GPU 12, including TSE 35. In on example, GPU 12 may be configured to determine vertices of a primitive (152). TSE 35 may then define edges of the primitive by determining a set of edge equations based on the determined vertices, wherein the edge equations are based on an edge shifting parameter plus an offset (154). TSE 35 may also be configured to determine pixels that touch the edges of the primitive using the determined edge equations (156), and rasterize the primitive using the determined pixels (158).

In another example of the disclosure, TSE 35 may be configured to calculate the offset based on a number of fractional bits supported by the processor. In one example, TSE 35 is configured to calculate the offset with the equation delta=1/(1<<num_fraction_bits), where delta is the offset and num_fraction_bits is the number of fractional bits supported by the processor.

In one or more examples, the functions described above may be implemented in hardware, software, firmware, or any combination thereof. If implemented in software, the functions may be stored as one or more instructions or code on an article of manufacture comprising a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for performing conservative rasterization in a processor, the method comprising:
    determining vertices of a primitive;
    determining a set of edge equations based on the determined vertices to define edges of the primitive, wherein the edge equations are based on an edge shifting parameter plus an offset, wherein the offset is based on a number of fractional bits supported by the processor;
    determining pixels that touch the edges of the primitive using the determined edge equations; and
    rasterizing the primitive using the determined pixels.

2. The method of claim 1, further comprising:
    calculating the offset with the equation delta=1/(1<<num_fraction_bits), wherein delta is the offset and num_fraction_bits is the number of fractional bits supported by the processor.

3. The method of claim 1, wherein the processor is a graphics processing unit (GPU).

4. The method of claim 3, wherein the set of edge equations is determined by a triangle setup engine (TSE) of the GPU.

5. An apparatus configured to perform conservative rasterization, the apparatus comprising:
    a memory configured to store primitive data; and
    a processor configured to:
        determine vertices of a primitive using the primitive data;
        determine a set of edge equations based on the determined vertices to define edges of the primitive, wherein the edge equations are based on an edge shifting parameter plus an offset, wherein the offset is based on a number of fractional bits supported by the processor;
        determine pixels that touch the edges of the primitive using the determined edge equations; and
        rasterize the primitive using the determined pixels.

6. The apparatus of claim 5, wherein the processor is further configured to:
    calculate the offset with the equation delta=1/(1<<num_fraction_bits), wherein delta is the offset and num_fraction_bits is the number of fractional bits supported by the processor.

7. The apparatus of claim 5, wherein the processor includes a graphics processing unit (GPU).

8. The apparatus of claim 7, wherein the set of edge equations is determined by a triangle setup engine (TSE) of the GPU.

9. An apparatus configured to perform conservative rasterization in a processor, the apparatus comprising:
    means for determining vertices of a primitive;
    means determining a set of edge equations based on the determined vertices to define edges of the primitive, wherein the edge equations are based on an edge shifting parameter plus an offset, wherein the offset is based on a number of fractional bits supported by the processor;
    means for determining pixels that touch the edges of the primitive using the determined edge equations; and
    means for rasterizing the primitive using the determined pixels.

10. The apparatus of claim 9, further comprising:
    means for calculating the offset with the equation delta=1/(1<<num_fraction_bits), wherein delta is the offset and num_fraction_bits is the number of fractional bits supported by the processor.

11. The apparatus of claim 9, wherein the processor is a graphics processing unit (GPU).

12. The apparatus of claim 11, wherein the means for determining the set of edge equations is a triangle setup engine (TSE) of the GPU.

13. A non-transitory computer-readable storage medium storing instructions that, when executed, cause one or more processors of a device configured to perform conservative rasterization to:
  determine vertices of a primitive;
  determine a set of edge equations based on the determined vertices to define edges of the primitive, wherein the edge equations are based on an edge shifting parameter plus an offset, wherein the offset is based on a number of fractional bits supported by the one or more processors;
  determine pixels that touch the edges of the primitive using the determined edge equations; and
  rasterize the primitive using the determined pixels.

14. The non-transitory computer-readable storage medium of claim 13, wherein the instructions further cause the one or more processors to:
  calculate the offset with the equation delta=1/(1<<num_fraction_bits), wherein delta is the offset and num_fraction_bits is the number of fractional bits supported by the one or more processors.

15. The non-transitory computer-readable storage medium of claim 13, wherein the one or more processors comprise a graphics processing unit (GPU).

16. The non-transitory computer-readable storage medium of claim 15, wherein the set of edge equations is determined by a triangle setup engine (TSE) of the GPU.

* * * * *